US012718836B2

(12) United States Patent
Morgan et al.

(10) Patent No.: US 12,718,836 B2
(45) Date of Patent: Aug. 25, 2026

(54) UNDERSTANDING AND RANKING RECORDED CONVERSATIONS BY CLARITY OF AUDIO

(71) Applicant: Calabrio, Inc., Minneapolis, MN (US)

(72) Inventors: Dylan Morgan, Minneapolis, MN (US); Boris Chaplin, Medina, MN (US); Kyle Smaagard, Forest Lake, MN (US); Chris Vanciu, Isle, MN (US); Laura Cattaneo, Rochester, MN (US); Matt Matsui, Minneapolis, MN (US); Paul Gordon, Minneapolis, MN (US); Catherine Bullock, Minneapolis, MN (US)

(73) Assignee: Calabrio, Inc., Minneapolis, MN (US)

( * ) Notice: Subject to any disclaimer, the term of this patent is extended or adjusted under 35 U.S.C. 154(b) by 0 days.

(21) Appl. No.: 18/046,476

(22) Filed: Oct. 13, 2022

(65) Prior Publication Data

US 2023/0215458 A1 Jul. 6, 2023

Related U.S. Application Data

(60) Provisional application No. 63/295,011, filed on Dec. 30, 2021.

(51) Int. Cl.
*G10L 25/60* (2013.01)
*G10L 25/27* (2013.01)

(52) U.S. Cl.
CPC .............. *G10L 25/60* (2013.01); *G10L 25/27* (2013.01)

(58) Field of Classification Search
CPC ............. H04M 3/5125; H04M 3/5175; H04M 2203/401; G10L 25/30; G10L 25/33; G10L 21/0308; G10L 25/84; G10L 25/60
See application file for complete search history.

(56) References Cited

U.S. PATENT DOCUMENTS

| | | | | |
|---|---|---|---|---|
| 2004/0249650 A1* | 12/2004 | Freedman | G06Q 30/0201 | 705/7.29 |
| 2014/0207447 A1* | 7/2014 | Jiang | G10L 15/08 | 704/233 |
| 2018/0034966 A1* | 2/2018 | te Booij | H04M 3/5232 | |
| 2020/0286504 A1* | 9/2020 | Seetharaman | G10L 21/0232 | |

* cited by examiner

*Primary Examiner* — Thomas H Maung

(57) ABSTRACT

Systems and methods are provided for generating quality scores associated with a contact (e.g., a telephonic call including an agent) and with agents. In particular, the disclosed technology determines types of frames of content of the contact into a speech and/or a noise, the noise further classified into a standard noise and a non-standard noise. A frame type determiner determines a type of a frame based on a waveform analysis and/or use of speech and noise models that are trained through machine learning. The standard noise includes noise that is expected and consistent across contacts and agents (e.g., a hold music). The non-standard noise includes a noise that is unexpected in occasion and audio sources (e.g., a barking dog, a siren from street, and the like). The disclosed technology enables assessing contacts and agents based on issues associated with remote working environment that vary among agents.

13 Claims, 7 Drawing Sheets

500A

Contact Attributes 502

| Agent 504 | Contact Identifier 506 | Speech Frames 508 | Non-standard Noise frames 510 | Quality Score 512 | Location 514 |
|---|---|---|---|---|---|
| one | 20211115001 | 150 | 50 | 3 (150/50) | Home |
| one | 20211115002 | 200 | 20 | 10 (200/20) | Home |

FIG. 5A

500B

Agent Attributes 520

| Agent 522 | Time Period 524 | Quality Score 526 |
|---|---|---|
| one | Nov 2021 | 6 |
| two | Nov 2021 | 2 |

FIG. 5B

UNDERSTANDING AND RANKING RECORDED CONVERSATIONS BY CLARITY OF AUDIO

CROSS-REFERENCE TO RELATED APPLICATIONS

This application claims priority to U.S. Provisional Application No. 63/295,011, filed Dec. 30, 2021, titled "Understanding and Ranking Recorded Conversations by Clarity of Audio," the entire disclosures of which is hereby incorporated herein by reference.

BACKGROUND

Understanding and assessing quality of conversations are of public interest to consumers and businesses. For example, customer support operations routinely assess the quality of incoming support contacts (e.g., calls). As the number of employees (e.g., agents at a contact center) working remotely (e.g., at home) continues to increase, an issue arises in maintaining uniform conditions for providing standard working environments and/or customer support operations under the various remote homes as workplaces. Some background noises may be more centrally controllable than other background noises during customer support operations. For example, hold music, dial tones, and a beep sound before starting a voicemail recording may be known and standardized by the customer support operations. In contrast, non-standard noises including mechanical background sounds (e.g., a motor, air conditioning), sirens, traffic sounds, ambient sounds, barking dogs, people talking in the background, may be difficult to be controlled in a standardized manner during customer support operations.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to performing an identification of the surrounding environmental state of a given contact (e.g., a call) and assessing the contact by generating metrics associated with quality of the contact. The contact can include recordings of one or more utterances by respective speakers and attributes of the contact. The attributes of the contact include identifiers of speakers and a time that the contact has taken place. Content of the contact includes audio. The content may include a plurality of channels or streams of audio corresponding to the various participants (e.g., an agent or a client) of the contact.

A contact analyzer receives and stores (e.g., records) content and attributes of a contact. Content of a contact includes a plurality of frames (e.g., audio frames). The contact analyzer determines quality metrics associated with the contact and transmits the quality metrics and contact attributes (e.g., an agent identifier, a call identifier, etc.). A frame type determiner identifies a type and a subtype associated with a frame of a contact. Types of a frame may include but are not limited to speech and noise. The speech type frame includes audio that is at least a part of a speech. The noise type frame includes subtypes of standard and non-standard. The standard noise includes a noise that occurs as a part of expected customer support operation. Examples of the standard noise includes but are not limited to hold music, a dial tone, and a beep tone before starting a voicemail recording. The hold music notifies a conversation participant to wait (hold) during a contact. In aspects, the standard noise may be a part of standardized customer support operation. Such standard noise may include, for example, interactive voice response (IVR) system noise and/or robotic process automation (RPA) system noise. In aspects, the non-standard noise includes but is not limited to a mechanical sound, a street sound, an ambient sound, a human voice as an environment sound, and an animal sound.

In aspects, the present disclosure identifies and includes frames of the non-standard subtype noise and excludes frames of the standard subtype noise in generating quality metrics of a contact in customer support operations. Traditional systems tend to include both subtypes of noise the standard noises as frames that negatively affect a quality of a contact. In contrast, the disclosed technology compares speech frames and the non-standard noise frames in generating quality scores. In doing so, aspects of the present disclosure provide improvements over prior systems in that the present technology is able to accurately determine the call quality while further identifying specific issues that may relate to poor quality. In doing so, aspects of the present disclosure provide increased accuracy when assessing content of a contact and an agent in contacts, which further allows for determining ways to improve the environmental settings of agents who answer and join contacts.

The present disclosure relates to systems and methods for processing a contact including a plurality of frames of audio including the speech of an agent. The method comprises receiving content associated with a contact, wherein the content includes a sequence of frames; determining a first set of frames from the sequence of frames, wherein the first set of frames includes at least a part of speech; determining a second set of frames from the sequence of frames, wherein the second set of frames includes non-standard noise; generating, based on the first set of frames and the second set of frames, a quality score associated with the contact; generating an agent quality score based on a combination of the generated quality score associated with the contact with another quality score associated with another contact including the agent; and transmitting at least one of the quality score associated with the contact or the agent quality score.

The method further comprises determining a third set of frames from the sequence of frames, wherein the third set of frames includes a noise, wherein the noise includes either a standard noise or the non-standard noise or both; determining a fourth set of frames from the third set of frames, wherein the fourth set of frame includes a standard noise; and determining, based on a difference between the third set of frames and the fourth set of frames, a second set of frames, wherein the second set of frames includes non-standard noise. The non-standard noise originates from at least one of: a mechanical source including a motor, a street, an ambient humming sound, a human as a source, or an animal as a source. The standard noise includes at least one of a hold music, a dial tone, or a beep sound before a voicemail recording starts. The determining of the second set of frames uses a waveform analysis of power levels based at least on one of: peak-to-peak amplitude, signal zero-crossing rate, short-term energy of a power spectrum, or a use of filters based on the Mel-frequency cepstrum coefficients. The determining of the second set of frames uses a frame classification model, wherein the frame classification model predicts the standard noise based on audio waveform.

The frame classification model includes a speech classification model and a noise classification model, and the method further comprises training the speech classification model using first ground truth data including an audio waveform of speech for machine learning; and training the noise classification model using second ground truth data including an audio waveform of at least one of hold music, a dial tone, or a beep sound for machine learning.

The method further comprises generating, based on the quality score associated with the contact including the agent, a quality score associated with the agent, wherein the quality score associated with the agent includes an average of a plurality of quality scores associated with contacts including the agent. The quality score associated with the contact is based on a ratio of an average power level of speech in the sequence of frames, and an average power level of non-standard noise in the sequence of frames. The method further comprises generating, based on a ratio of a first number of frames in the first set of frames over a second number of frames in the second set of frames, a quality score associated with the contact.

This Summary introduces a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 3A:
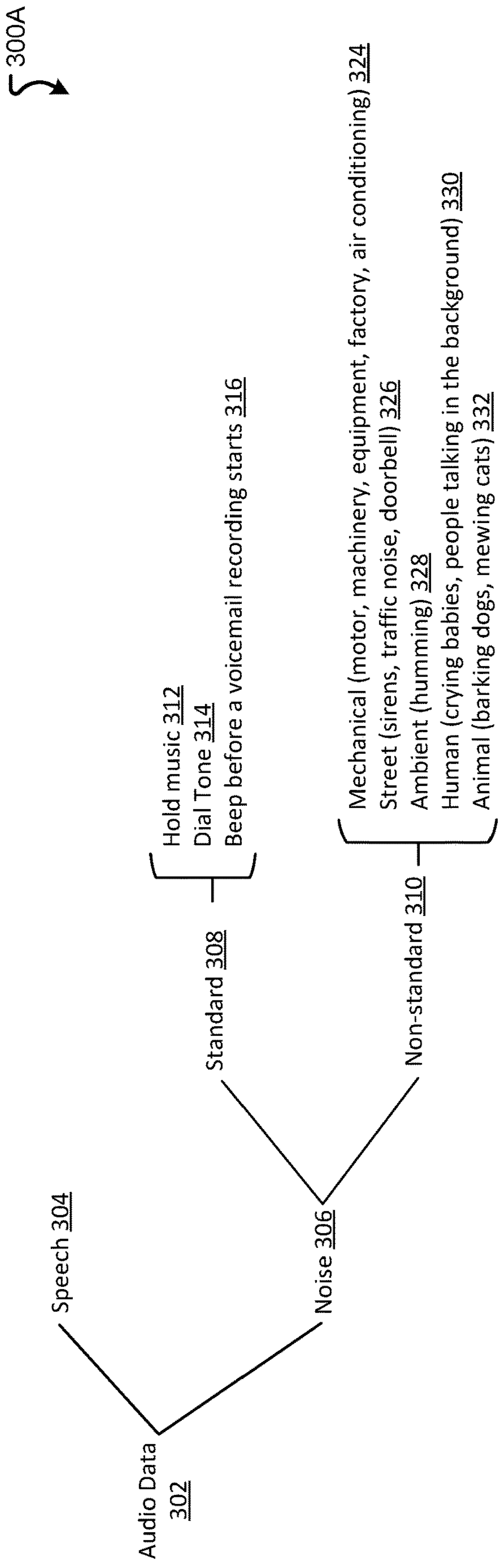
Figure 3B:
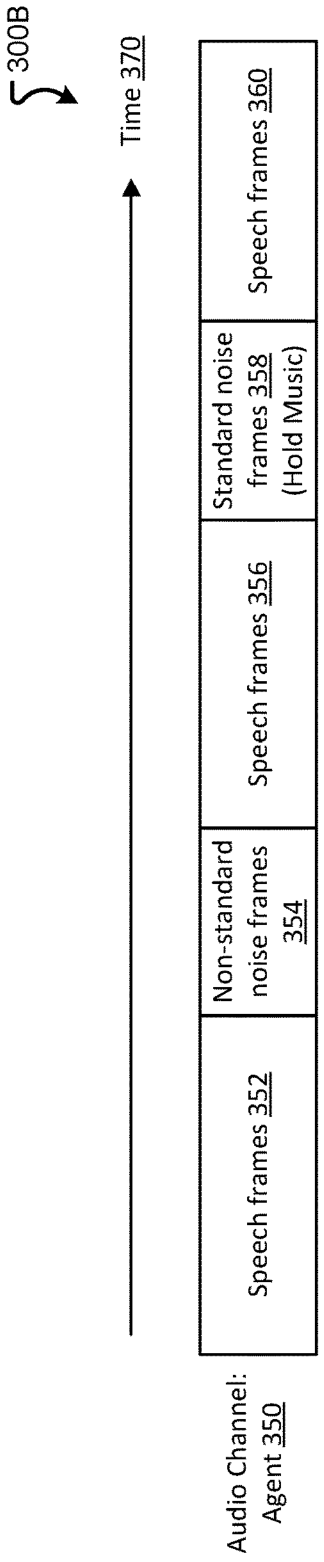

FIGS. 3A-B illustrate examples of types of frames in accordance with aspects of the present disclosure.

Figure 4:
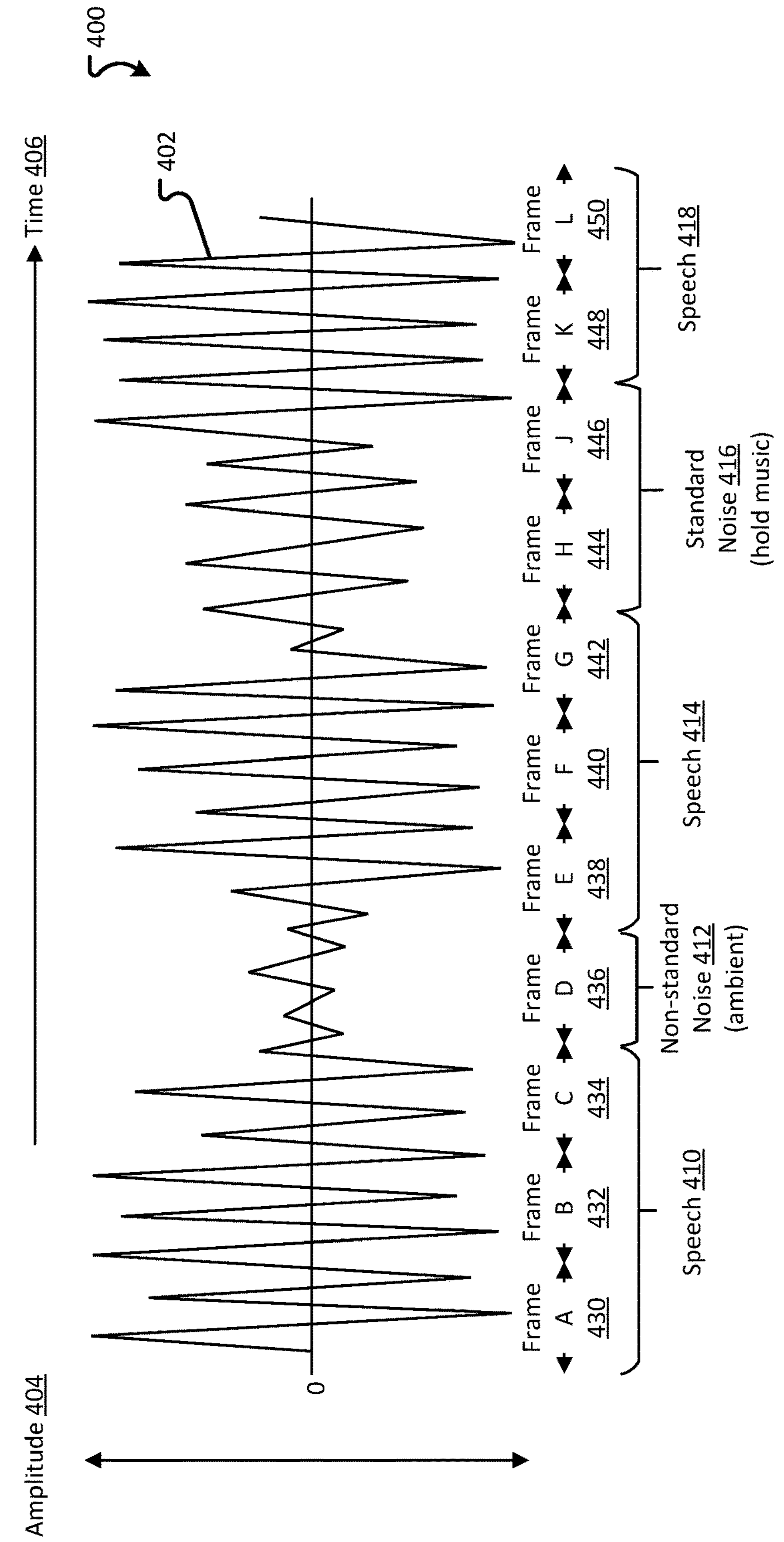

FIG. 4 illustrates an example of audio and frames associated with a contact in accordance with aspects of the present disclosure.

FIGS. 5A-B illustrate exemplary data associated with contacts and agent attributes with quality scores in accordance with aspects of the present disclosure.

Figure 6:
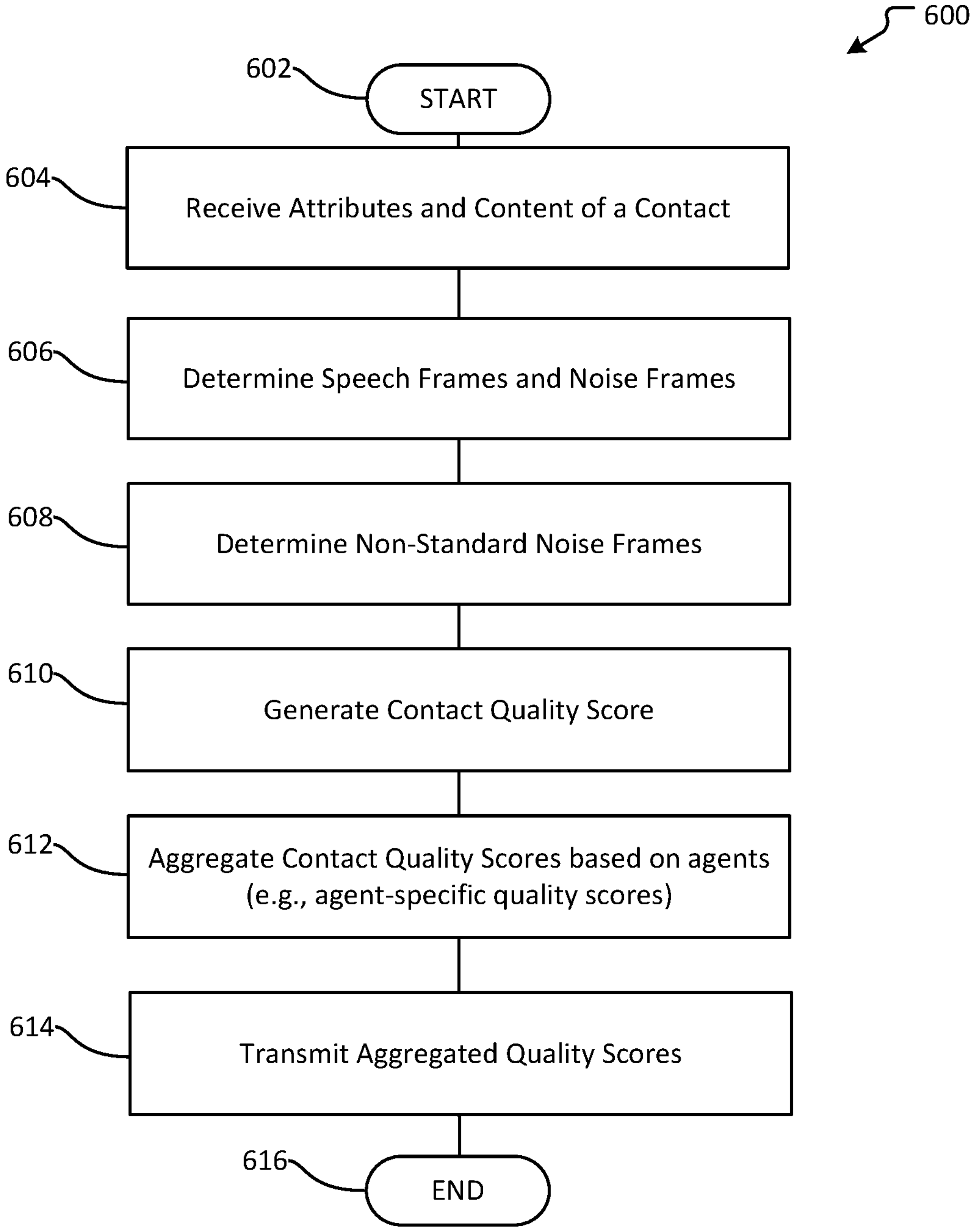

FIG. 6 illustrates an example method for determining quality metrics in accordance with aspects of the present disclosure.

Figure 7:
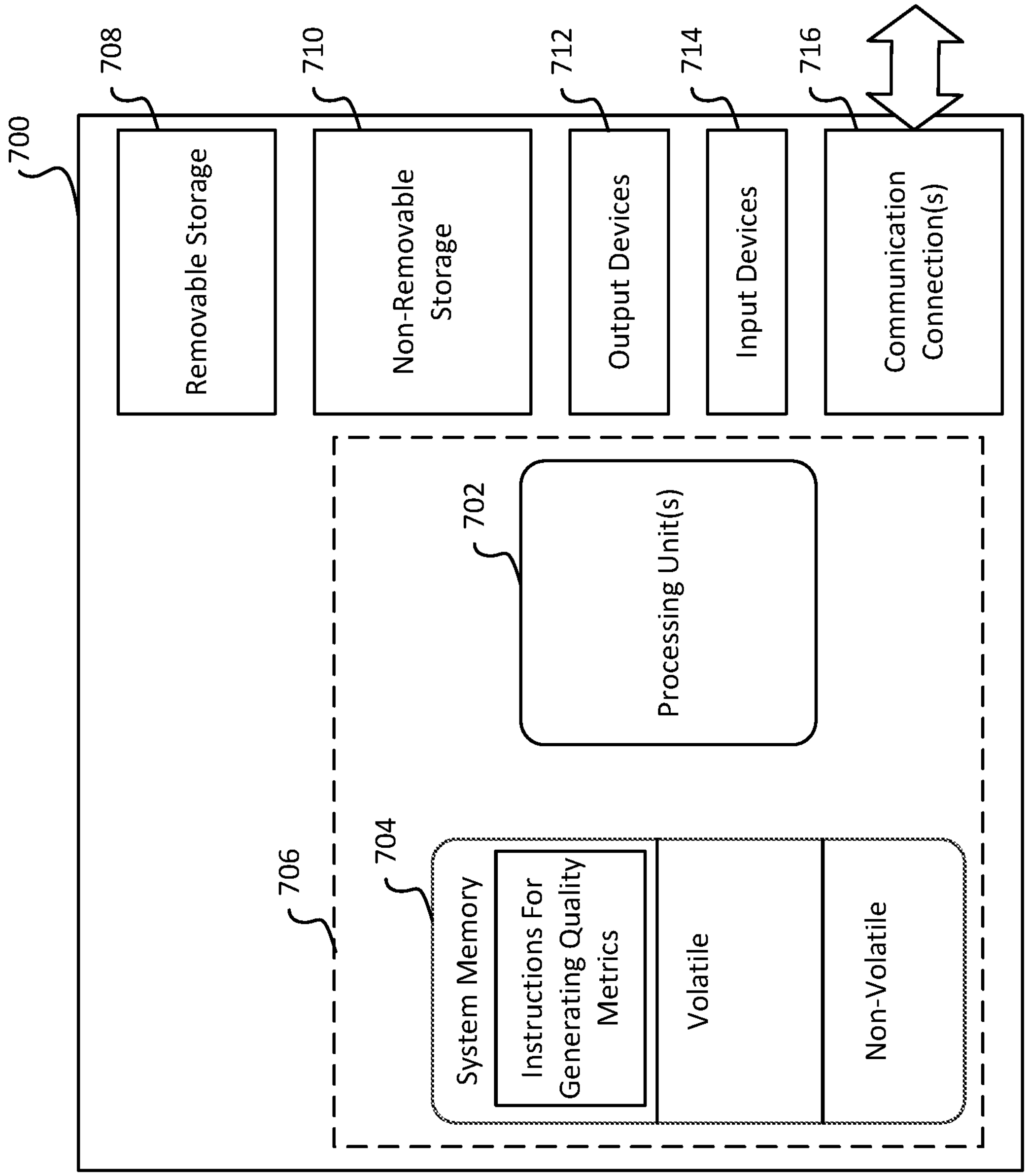

FIG. 7 illustrates a simplified block diagram of a device with which aspects of the present disclosure may be practiced in accordance with aspects of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Many traditional systems focus on analyzing the content of the calls to glean insights into the state of mind/situation of multiple parties. In contrast, there has been little understanding about the surrounding environmental state of a contact. There has been a need to identify how the remote work environment may affect the interaction during customer support operations (e.g., taking support calls). The term "contact" as used herein represents a communication (e.g., a call, a phone call, an email, an instant message, and the like) among participants. Accordingly, the contact may include one or more conversations between participants including speakers. For example, a contact may take place between a customer and a call center agent receiving a phone call. For example, a call occurring in a noisy environment is going to require multiple parties to request repeated information. The inability to communicate, caused by environmental factors, increases the chances of misinterpretation. Such situations may require both parties on the call to spend much more energy trying to understand the words being stated which can be mentally exhausting for the agent as well as the individual customer. For example, a customer who is already upset with a particular company is only going to grow more frustrated if they need to repeat every other sentence in order to be understood. This can aggravate the situation where the conversation goes much more poorly and continue to fuel additional negativity, perhaps causing the customer to end their relationship with the company in question.

In particular, in recent years, there have been increasing cases of agents who work from home. Working environments may vary among agents who work from various remote locations. In aspects, the contact center not only loses control over the agent's environment but also may face difficulty in becoming aware of issues that arise from the agent's environment in a timely manner. Furthermore, the remote work environment may also relinquish some level of infrastructure/hardware control to the agent. Agents may be using their own devices. Issues arise in predicting and proactively maintaining quality of the customer support operations. The only time supervisors may be aware of a problem is if they run across it on a random spot check or evaluation. As such, contact centers have much less control over the environment that an agent is taking calls in (and perhaps less hardware control with headsets/speakers). A robust quality assurance team can only review a small percentage of calls (~2%) and may or may not catch environments that are not conducive to good calls. An automated evaluation could indicate which agents are typically in noisy environments, hardware that is poor or other situations that can lead to poor customer experiences.

Traditional systems identified the environment settings issues "by chance," for example, when a supervisor or reviewer (i.e., an agent) notices the issue. Usually, the supervisor suspects that there may be an issue. Then that supervisor, or the quality assurance team evaluates samples of contacts to determine if the problem was systemic and/or determine if it is a potential hardware issue vs an environmental issue or infrastructure (e.g., internet connection or speed). Such analysis causes an excessive burden on the supervisor or the quality assurance team, who may be charged with monitoring hundreds or thousands of agents. Furthermore, some environment issues may be incidental.

For example, excessive barking by a dog in the background may only occur one-time and may be difficult to detect unless reviewing contacts in real time. Aspects of the present disclosure provide, among other benefits, improvements over prior systems in that the present technology accurately determines the call quality while further identifying specific issues that may relate to poor quality. In doing so, aspects of the present disclosure provide increased accuracy when assessing content of a contact and an agent in contacts, which further allows for determining ways to improve the environmental settings of agents who answer and join contacts. Further, while aspects of the present disclosure are described with respect to determining the quality of a call, one of skill in the art will appreciate that the present disclosure can be practiced with other media formats, such as video, video game streaming, etc., an applied to various types of environments or situations, such as interactive voice response (IVR) system noise, robotic process automation (RPA) system noise, etc.

As discussed in more detail below, the present disclosure relates to generating quality metrics associated with contacts based on distinct types of frames of contact. In aspects, a contact analyzer may analyze content and attributes of a contact and generate a transcript associated with content of a contact. The content of a contact may include a recording of the contact as audio, which may be currently in session or previously completed. The content may include a plurality of frames of audio. In aspects, a frame includes a segment of audio for a predetermined time duration. The contact analyzer may store contents of contacts in a database.

A frame type determiner of the contact analyzer may determine types of content (e.g., audio) associated with respective frames of the content. Examples of the types of content may include speech and noise. The noise may further include standard noise subtype (i.e., a standard noise) and non-standard noise subtype (i.e., a non-standard noise). A frame with the standard noise subtype may include one or more of predetermined types of sound. Examples of the standard noise may include a hold music, a dial tone, and beep tone before a voicemail recording starts. In aspects, the standard noises are centrally controllable during customer support operations.

A frame with the non-standard noise subtype may include a set of predetermined types of audio that are not among the standard noises. Examples of the non-standard noises may include sounds from a surrounding environment, mechanical sounds (e.g., a motor), street sounds, ambient sounds, music, air condition, vacuum cleaner, engines, automobile sounds, and the like. In aspects, the non-standard noises may be one-time, occasional, and often non-predictable. In aspects, the disclosed technology contrasts frames of non-standard noises from frames of speech during contacts and generates quality metrics associated with contacts. The quality metrics enables assessing quality of customer support operations.

A contact metrics generator of the contact analyzer generates quality metrics (e.g., quality scores) associated with frames of a contact. An agent metrics generator of the contact analyzer generates metrics (e.g., quality scores) associated with an agent who participated in the contact. A metric transmitter may transmit the respectively generated metrics for further analysis by supervisors and agents of the contact center. In aspects, the present disclosure may operate as a background monitoring of contacts, without interfering with real-time processing of receiving contacts and interacting with customers by agents at the contact center and/or at homes.

Figure 1:
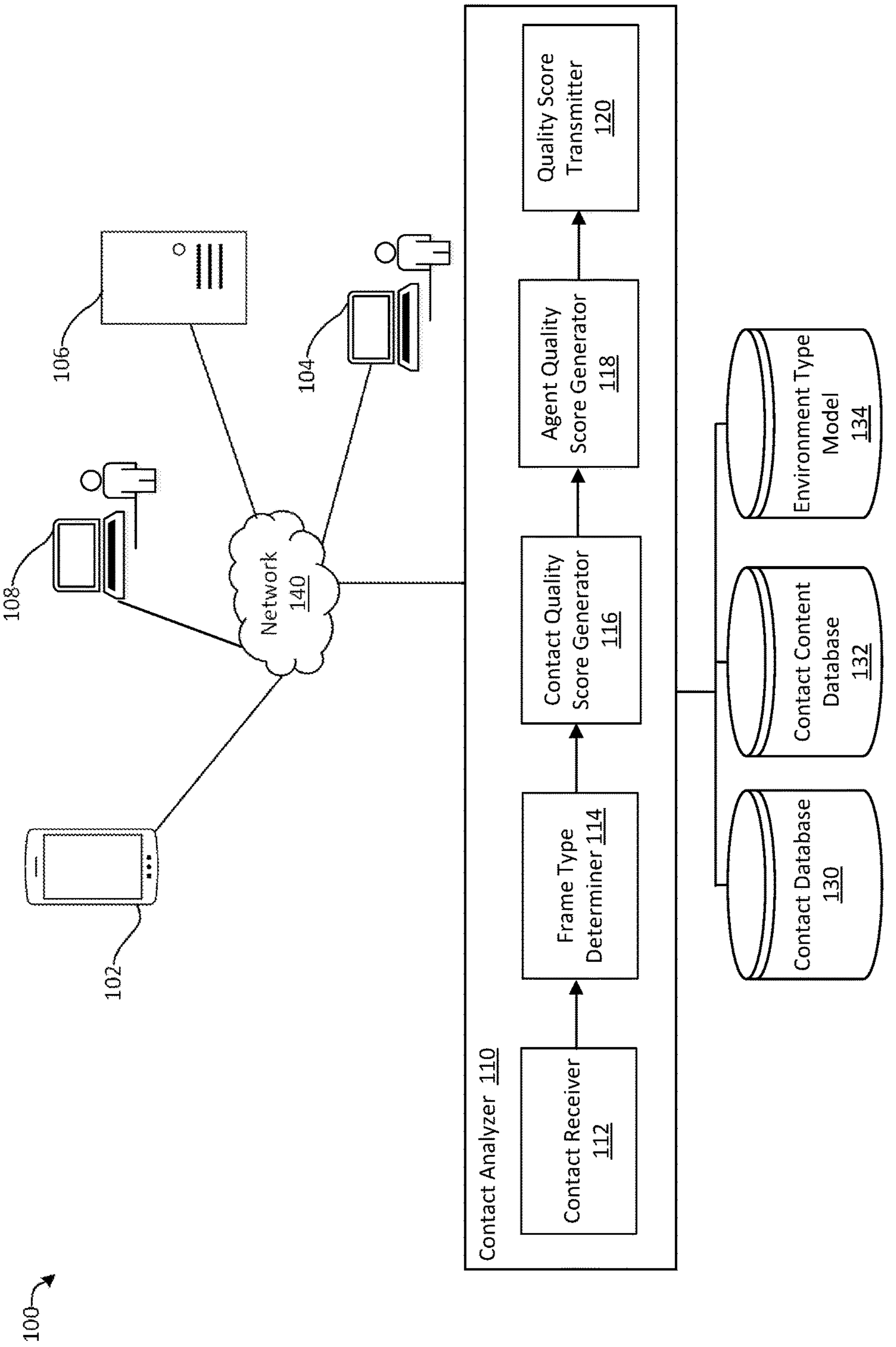
FIG. 1 illustrates an overview of an example system for generating metrics associated with audio quality in accordance with aspects of the present disclosure.

FIG. 1 illustrates an overview of an exemplary system for determining metrics associated with contacts and agents with a focus on the environment settings of contacts in accordance with aspects of the present disclosure. A system 100 may include a client-computing device 102, a computer terminal 104, a virtual assistant server 106, a supervisor device 108, and a contact analyzer 110 connected via a network 140. In aspects, the client-computing device 102 may include a smartphone and/or a phone device where a user (e.g., a customer) may participate in a contact or join a conversation with another speaker. The computer terminal 104 may include an operator station where an operator of a contact center may receive incoming contacts from customers (e.g., a user using the client-computing device 102). In alternate aspects, the virtual assistant server 106 may process a virtual assistant for the user using the client-computing device 102 over the network 140. In said scenarios, the user using the client-computing device 102 may join a conversation with a virtual assistant. The network 140 may be a computer communication network. In yet further alternate aspects, the supervisor device 108 may process operations by a supervisor of the operator at the contact center. For example, the supervisor may review recording of contacts received by a particular operator (i.e., an agent) of the contact center. The supervisor may request for and receive content and quality metrics associated with a contact in question by an agent at the contact center. In aspects, the quality metrics include scores that characterize environment settings of the agent during the contact. Additionally, or alternatively, the network 140 may include a public or private telecommunication network exchange to interconnect with ordinary phones (e.g., the phone devices).

The contact analyzer 110 receives and stores attributes of a contact in a contact database 130 and content of the contact in a contact content database 132. For example, contact content database 132 may include a recording (e.g., audio) of the contact, a transcript in text form of content of the contact, audio characteristics (e.g., tone, pitch, and the like) of content of the contact, attributes of the contact, text of the contact (e.g., an email or instant message conversation), and the like. The attributes of the contact may include, for example, one or more speaker identifiers identifying the particular call, a department or an organization receiving the contact, etc., an identifier of a contact center operator who received the call, and a contact duration. Furthermore, the contact data may include one or more pairs of a topic category and a degree of relevance of content of the contact to with the topic category.

The contact analyzer 110 includes a contact receiver 112, a frame type determiner 114, a contact quality score generator 116, an agent quality score generator 118, and a quality score transmitter 120. The contact receiver 112 receives call data associated with a contact. In aspects, the contact data may include a transcript of the utterances made during the contact. The contact receiver 112 may obtain content and attributes of a contact from one or more of the client-computing device 102, the computer terminal 104, and/or the virtual assistant server 106 over the network 140. Additionally, or alternatively, the contact receiver 112 may receive content and attributes of the contact from the network 140 as the network 140 transport the content and attributes of the contact among speakers of the contact. The contact receiver 112 may store received content in the contact content database 132.

The frame type determiner 114 determines types of environment settings associated with frames of content of a contact. In aspects, content of a contact includes a stream of audio. The stream of audio includes a plurality of frames in sequence per channel. Each frame may include at least a part of an audio segment in a predetermined time duration. In some aspects, the frame type determiner 114 determines a type associated a frame by performing a waveform analysis of the content. The waveform analysis may include matching a waveform of a frame with a predetermined waveform pattern that represents a particular type of audio environment settings. Exemplary methods of the waveform analysis may include but are not limited to peak-to-peak amplitude, signal zero-crossing rate, short-term energy of the power spectrum, the use of filters based on the Mel-frequency cepstrum coefficients, or a variety of other signal processing methods.

In some other aspects, the frame type determiner 114 may use machine-learning models trained to predict a type of audio environment settings by classifying respective frames of content. For example, the machine-leaning models may include an environment type model 134. The environment type model 134 may be used to predict a type of a frame based on a waveform. The environment type model 134 may be trained with examples of waveforms that come from speech, standard noises, and non-standard noises. The machine-learning models may be trained using waveforms or various distinct metrics obtained from signal processing or Fourier analysis of content data. In aspects, the frame type determiner 114 may distinguish types and subtypes of audio based at least on a difference in power levels of audio signal data.

In aspects, types of a frame may include but are not limited to speech and noise. The speech frame includes speech audio. The noise may further include a standard noise and a non-standard noise. The standard noise and the non-standard noise include various distinct types of noises in the environment settings. The standard noise may include but is not limited to a hold music, a beep tone before a recording of a voicemail starts, and a dial tone. The non-standard noise may include but is not limited to a mechanical sound, a street sound, an ambient sound, a human sound (e.g., crying babies, people taking in the background, and the like), and an animal sound.

In some aspects, the frame type determiner 114 determines types of at least a part of contact content. For example, content of a contact may include a plurality of channels of streaming audio, each channel corresponding to a stream of audio by an agent or a customer in a contact. A first section of a contact in the agent channel may be a speech, a second section of the contact may be a non-standard noise, a third section of the contact may be a standard noise (e.g., a hold-music), and the like.

The contact quality score generator 116 generates a quality score associated with a contact based on frame types of content of the contact. In aspects, the contact quality score generator 116 uses a Signal-to-Noise Ratio (SNR) on a frame-by-frame basis to compare one contact to another. For example, an SNR may be expressed as:

$$SNR = \frac{P_{signal}}{P_{noise}} \qquad (1)$$

In aspects, 'P' corresponds to an average signal power in a set of sampled points in a contact. $P_{signal}$ indicates an average signal power of a speech type as speech is meaningful type of data. $P_{noise}$ indicates an average power of non-standard noises. The non-standard noises are meaningless or unwanted input during a contact.

Additionally, or alternatively, the disclosed technology may isolate instances of non-standard noise frames that exceed a predetermined threshold (e.g., a power level) and comparing a number of these isolated non-speech frames against the speech frames. This would allow for a measure of 'acute noises' versus the speech level. In aspects, signal power that exceeds a power threshold could be removed from data for comparison, in order to measure an accurate 'background noise' level by removing short instances of loud non-speech from otherwise noise frames.

Additionally, or alternatively, the contact quality score generator 116 may determine contact a quality score based on a ratio of numbers of frames of various types during a contact. The contact quality score generator 116 may determine types of frames of a contact and compare a number of frames of respective types and subtypes. For example, the contact quality score generator 116 may determine a ratio between a number of frames that are of a speech type and a number of frames that are of non-standard noise.

The agent quality score generator 118 generates quality scores associated with an agent. In aspects, the quality metrics include a set of quality metrics associated with contacts that the agent has participated. Quality scores associated with an agent may indicate how the environment settings of the agent affected the quality of contacts. In some aspects, the agent quality scores include an average of contact quality scores for the agent. By aggregating by agent, quality scores may identify circumstances where an agent participates in a contact under in a poor environment setting or bad hardware. Such environment setting may be addressable by the agent and/or a supervisor. An average metric by agent over time may indicate deteriorating circumstances of equipment (e.g., hardware reaching an age for replacement) or trends of circumstances (e.g., the contact center and a home workplace) that needs improvement. In some other aspects, the agent quality scores may indicate how contact metrics vary over time or times of days for the agent. For example, the SNR for an agent in the morning may be higher than some other times of the day.

The quality score transmitter 120 may transmit contact quality scores and agent quality scores over the network 140 for the supervisors and the agents who review the call records. In aspects, the quality score transmitter 120 may store the contact metrics and/or agent metrics in the contact database 130 for a statistical analysis.

In aspects, the quality score transmitter 120 may transmit information of one or more quality scores associated with contacts. The quality score transmitter 120 may transmit the output to one or more of the client-computing device 102, the computer terminal 104, the supervisor device 108, and/or the virtual assistant server 106 through the network 140.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
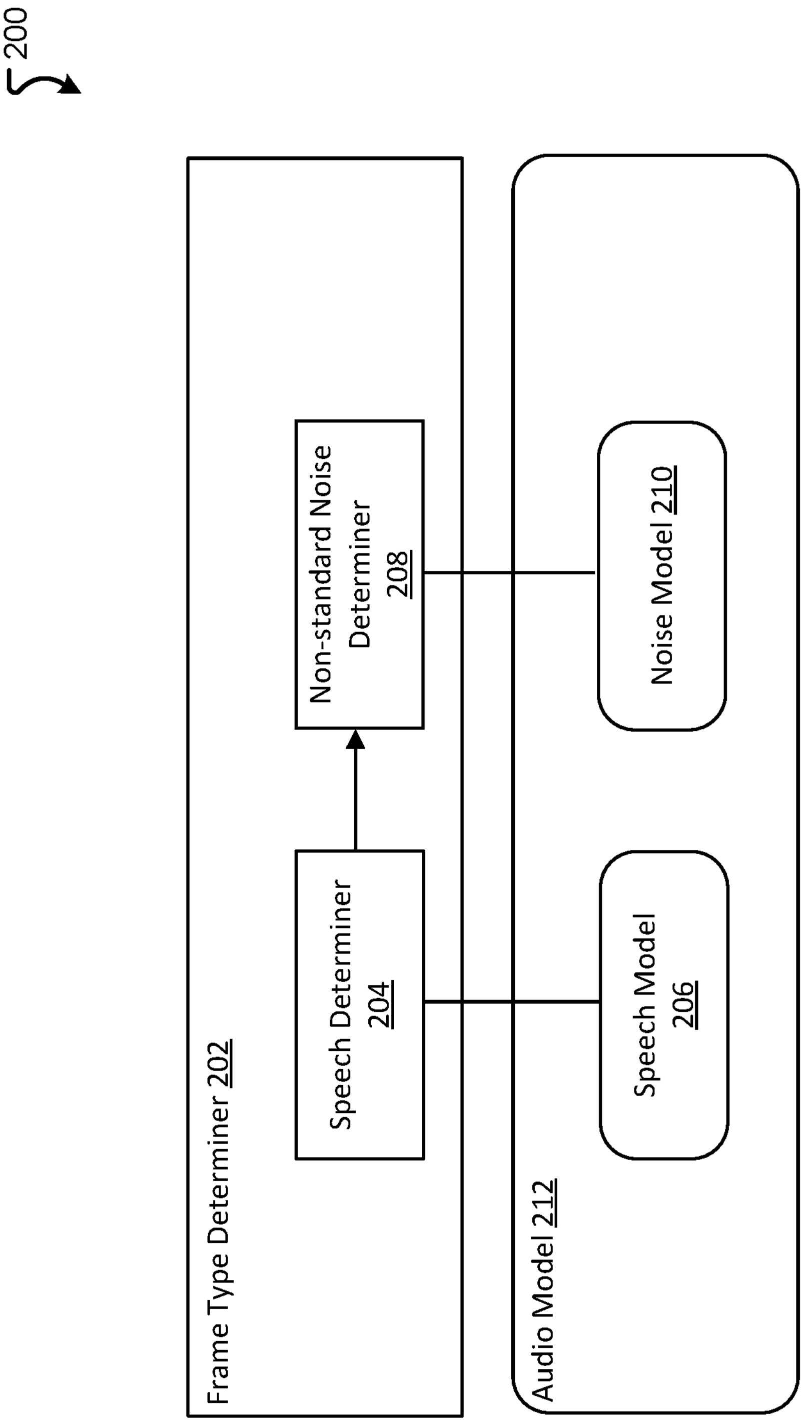
FIG. 2 illustrates an exemplary system for extracting substantive frames from audio in accordance with aspects of the present disclosure.

FIG. 2 illustrates an exemplary system for determining types of frames of a contact in accordance with aspects of the present disclosure. The system 200 includes a frame type determiner 202 (e.g., the frame type determiner 114 as shown in FIG. 1) and an audio model 212. In aspects, the frame type determiner 202 may include a speech determiner 204 and a non-standard noise determiner 208. An audio model 212 may include a speech model 206 and a noise model 210.

The speech determiner 204 determines a frame as a speech type. In aspects, the speech determiner 204 may use the speech model 206. The speech model 206 may be a machine-learning model that is trained to predict content of a frame as at least a part of speech. The speech model 206 may be trained based on examples of speech. In aspects, the speech determiner 204 labels respective frames that are of speech type as speech.

The non-standard noise determiner 208 determines a frame as a non-standard noise. In aspects, the non-standard noise determiner 208 uses the noise model 210. The noise model 210 is a trained model for predicting standard noises and non-standard noises. Examples of standard noise subtype may include but are not limited to a section of hold music, a beep sound (e.g., a beep sound before a voicemail recording starts), and a dial tone. Examples of non-standard noise subtype may include but are not limited to noises that originate from mechanical sound sources (e.g., a motor), from a street, from an ambient setting, from a human, from an animal, and the like. The disclosed technology identifies one or more of these subtypes of noises as detailed above and compare the non-standard noises with the speech. In aspects, the frame type determiner 202 may maintain a number of frames as counts of distinct types and subtypes of audio frames in environment settings.

As will be appreciated, the various methods, devices, applications, features, etc., described with respect to FIG. 2 are not intended to be limited to use of the system 200, rather the system 200 is provided as an exemplary system that may be used by the aspects disclosed herein. Accordingly, additional data structures or configurations may be used to practice the methods and systems herein and/or features and applications described may be excluded without departing from the methods and systems disclosed herein.

FIGS. 3A-B illustrate examples classifications of types of frames data in accordance with aspects of the present disclosure. FIG. 3A illustrates an exemplary classification of frame types as a graph in accordance with aspects of the present disclosure. A classification model 300A includes audio data 302 as a root type.

The audio data 302 includes speech 304 and noise 306. The noise 306 includes standard noise 308 and non-standard noise 310. In aspects, the standard noise 308 includes one or more subtypes: hold music 312, dial tone 314, and beep before a voice mail voicemail recording starts 316. The hold music includes placing the customer at ease while the customer waits for a long period. Traditional systems include these standard noises among factors that reduce quality of a contact based on a design that the standard noises do not include a speech made by a participant of the contact. In contrast, the present disclosure excludes the standard noises from frames that would reduce quality of a contact and includes non-standard noises in generating quality scores.

The non-standard noise 310 includes noises that originate from a mechanical source 324, from a street 326, an ambient sound 328, from human 330 (e.g., crying babies, people talking in the background, and the like), or from an animal 332. The mechanical source may include sounds from machinery, equipment, a factory, and/or air conditioning. The street sound may include sirens from emergency vehicles, a traffic noise (e.g., a sound of a vehicle passing by). The ambient sound includes humming sound in the background. The human sound may include crying babies, people talking in the background. The animals sound may include a dog barking and a cat mewing.

FIG. 3B illustrates an example of content associated with a contact in accordance with aspects of the present disclosure. An exemplary content 300B includes an audio channel associated with an agent 350 who participates in a contact. The audio channel for an agent 350 includes a series of frames (352, 354, 356, 358, and 360), grouped in types of frames in a sequence of time 370.

For example, the audio channel for the agent 350 includes a following sequence of frames: speech frames 352, non-standard noise frames 354, speech frames 356, standard noise frames 358 (hold music), and speech frames 360. In aspects, a frame type determiner (e.g., the frame type determiner 114 as shown in FIG. 1) determines types of the respective frames of audio.

For example, the exemplary content 300B may indicate that the agent speaking to the customer first (i.e., the speech frames 352). The contact proceeds to a period of an ambient noise (e.g., the non-standard noise frames 354). During the period of the non-standard noise, the agent does not speak but the ambient noise dominates the frame. Then, the agent resumed speaking to the customer (i.e., the speech frames 356). The agent places the customer on hold while playing a section of hold music (i.e., the standard noise frames 358). Then, the agent resumed talking (i.e., the speech frames 360).

By analyzing the sequence of frames of substantive type, a reviewer (e.g., a supervisor at the contact center) may notice noise issues to be rectified by improving specific aspects of working environment at home. Unlike traditional systems that fail in distinguishing frames between standard and non-standard, the present disclosure identifies issues that are unique to environment settings at homes for rectifying the quality of contacts.

As will be appreciated, the various methods, devices, applications, features, etc., described with respect to FIGS. 3A-B are not intended to limit use of the classification model 300A and the exemplary content 300B. Accordingly, additional and/or alternative processes and configurations may be used to practice the methods and systems herein and/or features and applications described may be excluded without departing from the methods and systems disclosed herein.

FIG. 4 illustrates an example of an audio channel associated with contact data with aspects of the present disclosure. The data 400 includes audio waveform 402 that corresponds to frames of an audio channel (e.g., the audio channel for the agent 350 as shown in FIG. 3B). The audio waveform 402 indicates varying amplitude 404 over time 406. Parts of the audio waveform 402 corresponds to frames (i.e., a frame A 430, a frame B 432, a frame C 434, a frame D 436, a frame E 438, a frame F 440, a frame G 442, a frame H 444, a frame J 446, a frame K 448, a frame L 450).

In aspects, each frame occurs for a predetermined time duration. A frame type determiner (e.g., the frame type determiner 114 as shown FIG. 1) determines types to the respective frames. For example, a set of the frame A 430, the frame B 432, and the frame C 434 corresponds to speech 410. A set of the frame D 436 corresponds to non-standard noise 412 (ambient). A set of the frame E 438, a frame F 440, and a frame G 442 corresponds to speech 414. A set of the frame H 444 and the frame J 446 corresponds to standard noise 416 because of a section of hold music. Moreover, a set of the frame K 448 and the frame L 450 corresponds to speech 418.

FIGS. 5A-B illustrate examples of quality scores associated with contacts and agents in accordance with aspects of the present disclosure. FIG. 5A illustrates an exemplary data structure for contacts in accordance with aspects of the present disclosure. Data structure 500A includes attributes of contacts grouped by agents. The contact attributes 502 includes columns that corresponds to agent 504, contact identifier 506, a number of speech frames 508, a number of non-standard noise frames 510, a quality score 512, and a location 514. The agent 504 indicates an identifier of an agent (a support staff who answered a call from a customer) associated with a contact. Locations where the agent joining the contact may be at a contact center as a workplace, at home, or other remote locations. The contact identifier 506 indicates an identifier associated with a contact (e.g., a support call). The speech frames 508 indicate a number of speech frames as determined (e.g., the speech 304 as shown in FIG. 3A) during the contact. The non-standard noise frames 510 indicate a number of frames of non-standard noise subtype (e.g., the non-standard noise 310 as shown in FIG. 3A)). The quality score 512 indicates a score for quality metrics associated with the contact.

In aspects, a contact quality score generator (e.g., the contact quality score generator 116 as shown in FIG. 1) generates the quality score 512. The contact metrics generator may determine contact quality scores based on a ratio of a number of frames of various types. For example, a quality score associated with a contact may be defined as a ratio of a number of speech frames over a number of non-standard noise frames.

For example, an agent one is a part of a contact 20211115001, which included one hundred and fifty speech frames and fifty non-standard noise frames. Accordingly, its quality score may be computed as a value three (150/50). Agent one is a part of another contact 20211115002, which included two hundred speech frames and twenty non-standard noise frames. Accordingly, its quality score becomes a value ten (200/20). This particular example uses a number of frames of the respective types as the basis for generating quality scores. Additionally, or alternatively, the disclosed technology may generate quality scores based on signal-to-noise ratio values associated with respective frames in a contact.

In contrast to traditional systems that include the standard noise as a part of a noise for determining a quality of a conversation, the disclosed technology focuses upon speech frames and non-standard noise frames for generating a quality score 512. In aspects, the disclosed technology excludes standard noise frames from determining a quality score associated with a contact. In effect, the present disclosure improves accuracy of assessing content of a contact and an agent in contacts, particularly for improving environment settings of agents who answer and join contacts.

FIG. 5B illustrates an exemplary data structure for contacts in accordance with aspects of the present disclosure. Data structure 500B includes attributes of agents, agents one and two as examples, grouped by a time period. Agent attributes 520 include agent 522, a time period 524, and a quality score 526. For example, a quality score 526 (i.e., agent metrics) may be an average of quality scores associated with contacts that respective agents have participated in. Agent one during the month of November 2021 indicates a quality score of six. Agent two during the month of November 2021 indicates a quality score of two. In the example, an agent with a higher quality score indicates providing a higher quality of contacts.

An agent with a low quality score may be experiencing contacts in an environment setting where non-standard noises may be persisting. For example, an agent may be working in an environment where a dog is frequently barking while contacts take place. Another agent may be taking phone calls for contacts at a place where there is a loud siren from emergency vehicles pass by frequently. Generating quality scores enables the agent and supervisors of the agent to assess issues associated with remote working environment and act toward a resolution.

FIG. 6 illustrates an exemplary method associated with generating contact metrics based on distinct types of frames of content of a contact according to aspects of the present disclosure. A general order of the operations for the method 600 is shown in FIG. 6. Generally, the method 600 begins with start operation 602 and end with end operation 616. The method 600 may include more or fewer steps or may arrange the order of the steps differently than those shown in FIG. 6. The method 600 can be executed as a set of computer-executable instructions executed by a cloud system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3A-B, 4, 5A-B, and 7.

Following start operation 602, the method 600 begins with receive operation 604, which receives content and attributes of a contact. In aspects, content of a contact includes audio and other content associated with the contact in a sequence of frames over time. Attributes of a contact may include identifiers of participants of the contact, a location of the agent who participated in the contact, timestamps of the contact, and the like. The receive operation 604 may store the received content in a contact content data database (e.g., the contact content database 132 as shown in FIG. 1). In aspects, the receive operation 604 may receive attributes of the content and store the attributes in a contact database (e.g., the contact database 130 as shown in FIG. 1).

A determine speech frames and noise frames operation 606 determines and/or identifies frames of speech type and noise type from the frames of a content. In aspects, the determine speech frames and noise frames operation 606 may use one or more waveform analyses and/or a machine-leaning model (e.g., a speech model 206 as shown in FIG. 2).

A determine non-standard noise frames operation 608 determines and/or identifies frames of a non-standard type from the noise frames. In aspects, the non-standard type includes noises that originate from various sources including but not limited to mechanical sources, a street noise, an ambient noise, a human source, and an animal source.

In aspects, a noise frame may be standard noise. The standard noise includes but not limited to a section of hold music (e.g., the hold music 312 as shown in FIG. 3A), a dial tone 314 (e.g., the dial tone 314 as shown in FIG. 3A), a beep sound before a voicemail recording starts (e.g., the beep before a voicemail recording starts 316 as shown in FIG. 3A).

A generate contact quality score operation 610 generates a quality score associated with the contact based on the respective types of frames in the contact. The quality score may represent quality metrics for the contact. In aspects, the contact quality score indicates a noise issue associated with environment settings of the contact. The generate contact quality score operation 610 may determine a contact quality score based on a ratio of a number of speech frames over a number of non-standard noise frames in the contact (e.g., the quality score 512 as shown in FIG. 5A).

An aggregate operation 612 aggregates contact quality scores based on agents into agent metrics (i.e., a quality score associated with and/or specific to an agent). In aspects, a quality score associated with an agent may be based on an average of contact quality scores that the agent joined. In some aspects, the aggregate operation 612 aggregates contact metrics over a predefined time (e.g., during a month of November 2021). In some other aspects, the aggregate operation 612 may rank agents based on agent metrics for comparing agents according to issues that relate to work environment.

A transmit operation 614 transmits the agent metrics (aggregated over time) and/or contact metrics. In aspects, the transmit operation 614 may transmit the agent metrics to the computing terminal used by an agent of the contact center. The agent of the contact center may inquire and receive agent metrics of other agents (and/or contacts) who spoke in contacts. The method 600 ends with the end operation 616.

As should be appreciated, operations 602-616 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 illustrates a simplified block diagram of a device with which aspects of the present disclosure may be practiced in accordance with aspects of the present disclosure. The device may be a mobile computing device, for example. One or more of the present embodiments may be implemented in an operating environment 700. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 700 typically includes at least one processing unit 702 and memory 704. Depending on the exact configuration and type of computing device, memory 704 (e.g., instructions for generating quality metrics as disclosed herein) may be volatile (such as RAM), non-volatile (such as ROM, flash memory, etc.), or some combination of the two. This most basic configuration is illustrated in FIG. 7 by dashed line 706. Further, the operating environment 700 may also include storage devices (removable, 708, and/or non-removable, 710) including, but not limited to, magnetic or optical disks or tape. Similarly, the operating environment 700 may also have input device(s) 714 such as remote controller, keyboard, mouse, pen, voice input, on-board sensors, etc. and/or output device(s) 712 such as a display, speakers, printer, motors, etc. Also included in the environment may be one or more communication connections 716, such as LAN, WAN, a near-field communications network, a cellular broadband network, point to point, etc.

Operating environment 700 typically includes at least some form of computer readable media. Computer readable media can be any available media that can be accessed by the at least one processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets, and the Internet.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for processing a contact including a plurality of frames of audio including a speech of an agent. The method comprises receiving content associated with a contact, wherein the content includes a sequence of frames; determining a first set of frames from the sequence of frames, wherein the first set of frames includes at least a part of speech; determining a second set of frames from the sequence of frames, wherein the second set of frames includes non-standard noise; generating, based on the first set of frames and the second set of frames, a quality score associated with the contact; generating an agent quality score based on a combination of the generated quality score associated with the contact with another quality score associated with another contact including the agent; and transmitting at least one of the quality score associated with the contact or the agent quality score. The method further comprises determining a third set of frames from the sequence of frames, wherein the third set of frames includes a noise, wherein the noise includes standard noise and non-standard noise; determining a fourth set of frames from the third set of frames, wherein the fourth set of frame includes a standard noise; and determining, based on a difference between the third set of frames and the fourth set of frames, a second set of frames, wherein the second set of frames includes non-standard noise. The non-standard noise originates from at least one of: a mechanical source, a street, an ambient humming sound, a human as a source, or an animal as a source. The standard noise includes at least one of a hold music, a dial tone, or a beep sound before a voicemail recording starts. The determining of the second set of frames uses a waveform analysis of power levels based at least on one of: peak-to-peak amplitude, signal zero-crossing rate, short-term energy of a power spectrum, or a use of filters based on the Mel-frequency cepstrum coefficients. The determining the second set of frames uses a frame classification model, wherein the frame classification model predicts the standard noise based on audio waveform. The frame classification model includes a speech classification model and a noise classification model, and the method further comprises training the speech classification model using first ground truth data including an audio waveform of the speech for machine learning; and training the noise classification model using second ground truth data including an audio waveform of at least one of hold music, a dial tone, or a beep sound for machine learning. The method further comprises generating, based on the quality score associated with the contact including the agent, a quality score associated with the agent, wherein the quality score associated with the agent includes an average of a plurality of quality scores associated with contacts including the agent. The quality score associated with the contact is based on a ratio of: an average power level of speech in the sequence of frames, and an average power level of non-standard noise in the sequence of frames. The method further comprises generating, based on a ratio of a first number of frames in the first set of frames over a second number of frames in the second set of frames, a quality score associated with the contact.

Another aspect of the technology relates to a system for processing a contact including a plurality of frames of audio including a speech of an agent. The system comprises a processor; and a memory storing computer-executable instructions that when executed by the processor cause the system to execute a method comprising: receiving content associated with a contact, wherein the content includes a sequence of frames; determining a first set of frames from the sequence of frames, wherein the first set of frames includes at least a part of speech; determining a second set of frames from the sequence of frames, wherein the second set of frames includes non-standard noise; generating, based on the first set of frames and the second set of frames, a quality score associated with the contact; generating an agent quality score based on a combination of the generated quality score associated with the contact with another quality score associated with another contact including the agent; and transmitting at least one of the quality score associated with the contact or the agent quality score. The computer-executable instructions when executed by the processor further cause a method comprises determining a third set of frames from the sequence of frames, wherein the third set of frames includes a noise, wherein the noise includes standard noise and non-standard noise; determining a fourth set of frames from the third set of frames, wherein the fourth set of frame includes a standard noise; and determining, based on a difference between the third set of frames and the fourth set of frames, a second set of frames, wherein the second set of frames includes non-standard noise. The non-standard noise originates from at least one of: a mechanical source, a street, an ambient humming sound, a human as a source, or an animal as a source, and wherein the standard noise includes at least one of: a hold music, a dial tone, or a beep sound before a voicemail recording starts. The determining the second set of frames uses a waveform analysis of power levels based at least on one of: peak-to-peak amplitude, signal zero-crossing rate, short-term energy of a power spectrum, or a use of filters based on the Mel-frequency cepstrum coefficients. The quality score associated with the contact is based on a ratio of: an average power level of speech in the sequence of frames, and an average power level of non-standard noise in the sequence of frames.

In still further aspects, the technology relates to a computer-readable storage medium. The computer-readable storage medium storing computer-executable instructions that when executed by a processor cause a computer system to execute a method for processing a contact including a plurality of frames of audio including a speech of an agent, comprising receiving content associated with a contact, wherein the content includes a sequence of frames; determining a first set of frames from the sequence of frames, wherein the first set of frames includes at least a part of speech; determining a second set of frames from the sequence of frames, wherein the second set of frames includes non-standard noise; generating, based on the first set of frames and the second set of frames, a quality score associated with the contact; generating an agent quality score based on a combination of the generated quality score associated with the contact with another quality score associated with another contact including the agent; and transmitting at least one of the quality score associated with the contact or the agent quality score. The computer-executable instructions when executed by the processor further cause a method comprising determine a third set of frames from the sequence of frames, wherein the third set of frames includes a noise, wherein the noise includes standard noise and non-standard noise; determine a fourth set of frames from the third set of frames, wherein the fourth set of frame includes a standard noise; and determine, based on a difference between the third set of frames and the fourth set of frames, a second set of frames, wherein the second set of frames includes non-standard noise. The non-standard noise originates from at least one of: a mechanical source, a street, an ambient humming sound, a human as a source, or an animal as a source, and wherein the standard noise includes at least one of: a hold music, a dial tone, or a beep sound before a voicemail recording starts. The determining of the second set of frames uses a waveform analysis of power levels based at least on one of: peak-to-peak amplitude, signal zero-crossing rate, short-term energy of a power spectrum, or a use of filters based on the Mel-frequency cepstrum coefficients. The quality score associated with the contact is based on a ratio of: an average power level of speech in the sequence of frames, and an average power level of non-standard noise in the sequence of frames.

Any of the one or more above aspects in combination with any other of the one or more aspect. Any of the one or more aspects as described herein.

What is claimed is:

1. A method for processing a contact including a plurality of frames of audio including speech of an agent, the method comprising:

receiving content associated with a contact, wherein the content comprises an audio waveform and wherein the audio waveform comprises a sequence of frames;

determining a first set of frames from the sequence of frames, wherein the first set of frames includes at least a part of speech, wherein the first set of frames is identified using a first machine learning model, wherein the first machine learning model is trained using exemplary speech waveforms in order to identify frames that comprise speech;

determining a second set of frames from the sequence of frames, wherein the second set of frames includes non-standard noise, wherein the second set of frames is determined using a noise classification machine learning model, the noise classification machine learning model has been trained using waveform data related to non-standard noises, the standard noise includes at least one of:

a section of hold music, interactive voice response (IVR) system noise, robotic process automation (RPA) system noise, a dial tone, or a beep sound before a voicemail recording starts, the non-standard noise originates from at least one of:

a mechanical source, a street, an ambient humming sound, a human as a source, or an animal as a source, and the determining the second set of frames further comprises:

determining a third set of frames from the sequence of frames, wherein the third set of frames includes a noise, wherein the noise includes the standard noise and the non-standard noise;

determining a fourth set of frames from the third set of frames, wherein the fourth set of frames includes the standard noise; and determining, based on a difference between the third set of frames and the fourth set of frames, the second set of frames, wherein the second set of frames includes the non-standard noise;

generating, based on the first set of frames and the second set of frames, a quality score associated with the contact;

generating an agent quality score by aggregating the quality score with a plurality of quality scores associated with the agent across a plurality of contacts, wherein the agent quality score identifies deterioration of hardware equipment associated with the agent; and transmitting at least one of the quality score associated with the contact or the agent quality score.

2. The method of claim 1, wherein the determining the second set of frames uses a waveform analysis of power levels based at least on one of:

peak-to-peak amplitude, signal zero-crossing rate, short-term energy of a power spectrum, or a use of filters based on the Mel-frequency cepstrum coefficients.

3. The method of claim 1, wherein the determining the second set of frames uses a frame classification model, wherein the frame classification model predicts the standard noise based on audio waveform.

4. The method of claim 3, wherein the frame classification model includes a speech classification model and a noise classification model, and the method further comprising:

training the speech classification model using first ground truth data including an audio waveform of the speech for machine learning; and training the noise classification model using second ground truth data including an audio waveform of at least one of hold music, a dial tone, or a beep sound for machine learning.

5. The method of claim 1, the method further comprising:

generating, based on the quality score associated with the contact including the agent, a quality score associated with the agent, wherein the quality score associated with the agent includes an average of a plurality of quality scores associated with contacts including the agent.

6. The method of claim 1, wherein the quality score associated with the contact is based on a ratio of:

an average power level of speech in the sequence of frames, and an average power level of non-standard noise in the sequence of frames.

7. The method of claim 1, the method further comprising:

generating, based on a ratio of a first number of frames in the first set of frames over a second number of frames in the second set of frames, the quality score associated with the contact.

8. A system for processing a contact including a plurality of frames of audio including speech of an agent, the system comprises:

a processor; and a memory storing computer-executable instructions that when executed by the processor cause the system to execute a method comprising:

receiving content associated with a contact, wherein the content comprises an audio waveform and wherein the audio waveform comprises a sequence of frames;

determining a first set of frames from the sequence of frames, wherein the first set of frames includes at least a part of speech, wherein the first set of frames is identified using a first machine learning model, wherein the first machine learning model is trained using exemplary speech waveforms in order to identify frames that comprise speech;

determining a second set of frames from the sequence of frames, wherein the second set of frames includes non-standard noise, wherein the second set of frames is determined using a noise classification machine learning model, the noise classification machine learning model has been trained using waveform data related to non-standard noises, the standard noise includes at least one of:

a section of hold music, interactive voice response (IVR) system noise, robotic process automation (RPA) system noise, a dial tone, or a beep sound before a voicemail recording starts, the non-standard noise originates from at least one of:

a mechanical source,
a street,
an ambient humming sound,
a human as a source, or
an animal as a source, and
the determining the second set of frames further comprises:
determining a third set of frames from the sequence of frames, wherein the third set of frames includes a noise, wherein the noise includes standard noise and non-standard noise;
determining a fourth set of frames from the third set of frames, wherein the fourth set of frames includes the standard noise; and
determining, based on a difference between the third set of frames and the fourth set of frames, the second set of frames, wherein the second set of frames includes the non-standard noise;
generating, based on the first set of frames and the second set of frames, a quality score associated with the contact;
generating an agent quality score by aggregating the quality score with a plurality of quality scores associated with the agent across a plurality of contacts, wherein the agent quality score identifies deterioration of hardware equipment associated with the agent; and
transmitting at least one of the quality score associated with the contact or the agent quality score.

9. The system of claim 8, wherein the determining the second set of frames uses a waveform analysis of power levels based at least on one of:
peak-to-peak amplitude,
signal zero-crossing rate,
short-term energy of a power spectrum, or
a use of filters based on the Mel-frequency cepstrum coefficients.

10. The system of claim 8, wherein the quality score associated with the contact is based on a ratio of:
an average power level of speech in the sequence of frames, and
an average power level of non-standard noise in the sequence of frames.

11. A computer-readable storage medium storing computer-executable instructions that when executed by a processor cause a computer system to execute a method for processing a contact including a plurality of frames of audio including speech of an agent, comprising:
receiving content associated with a contact, wherein the content comprises an audio waveform and wherein the audio waveform comprises a sequence of frames;
determining a first set of frames from the sequence of frames, wherein the first set of frames includes at least a part of speech, wherein the first set of frames is identified using a first machine learning model, wherein the first machine learning model is trained using exemplary speech waveforms in order to identify frames that comprise speech;

determining a second set of frames from the sequence of frames, wherein the second set of frames includes non-standard noise,
wherein the second set of frames is determined using a noise classification machine learning model,
the noise classification machine learning model has been trained using waveform data related to non-standard noises,
the standard noise includes at least one of:
a section of hold music,
interactive voice response (IVR) system noise,
robotic process automation (RPA) system noise,
a dial tone, or
a beep sound before a voicemail recording starts,
the non-standard noise originates from at least one of:
a mechanical source,
a street,
an ambient humming sound,
a human as a source, or
an animal as a source, and
the determining the second set of frames further comprises:
determining a third set of frames from the sequence of frames, wherein the third set of frames includes a noise, wherein the noise includes standard noise and non-standard noise;
determining a fourth set of frames from the third set of frames, wherein the fourth set of frames includes the standard noise; and
determining, based on a difference between the third set of frames and the fourth set of frames, the second set of frames, wherein the second set of frames includes the non-standard noise;
generating, based on the first set of frames and the second set of frames, a quality score associated with the contact;
generating an agent quality score by aggregating the quality score with a plurality of quality scores associated with the agent across a plurality of contacts, wherein the agent quality score identifies deterioration of hardware equipment associated with the agent; and
transmitting at least one of the quality score associated with the contact or the agent quality score.

12. The computer-readable storage medium of claim 11, wherein the determining the second set of frames uses a waveform analysis of power levels based at least on one of:
peak-to-peak amplitude,
signal zero-crossing rate,
short-term energy of a power spectrum, or
a use of filters based on the Mel-frequency cepstrum coefficients.

13. The computer-readable storage medium of claim 11, wherein the quality score associated with the contact is based on a ratio of:
an average power level of speech in the sequence of frames, and
an average power level of non-standard noise in the sequence of frames.

* * * * *